United States Patent [19]

Kowalski et al.

[11] 4,311,557

[45] Jan. 19, 1982

[54] REFUELING MACHINE FOR A NUCLEAR REACTOR

[75] Inventors: Edward F. Kowalski, Glen Hazel; Kenneth J. Swidwa, Cheswick; Leonard P. Hornak, North Huntington, all of Pa.

[73] Assignee: Westinghouse Electric Corp., Pittsburgh, Pa.

[21] Appl. No.: 84,036

[22] Filed: Oct. 12, 1979

[51] Int. Cl.³ .............................................. G21C 19/20
[52] U.S. Cl. ................... 376/271; 294/86 A; 414/146
[58] Field of Search .................. 176/30; 414/146; 294/86 A

[56] References Cited

U.S. PATENT DOCUMENTS

| | | | |
|---|---|---|---|
| 3,691,011 | 9/1972 | Krüjer | 176/30 |
| 3,948,723 | 4/1976 | Andrea | 176/30 |
| 4,086,132 | 4/1978 | Meuschke | 176/30 |

*Primary Examiner*—Donald P. Walsh
*Attorney, Agent, or Firm*—J. R. Campbell; Z. L. Dermer

[57] ABSTRACT

A refueling machine for inserting and removing fuel assemblies from a nuclear reactor including a pair of concentrically disposed stationary masts mounted on a movable bridge which spans the containment walls of the reactor. The bridge supports a trolley movable transversely to bridge movement thus providing an arrangement wherein the masts can be precisely positioned over a fuel assembly in the reactor core. A hoist mounted on the outer of the masts supports a vertically movable inner mast of a size sufficient to enclose a fuel assembly. An actuator tube inside the inner mast moves gripper fingers on the bottom thereof into engagement with the top nozzle of a fuel assembly prior to lifting it upwardly out of the reactor core.

16 Claims, 11 Drawing Figures

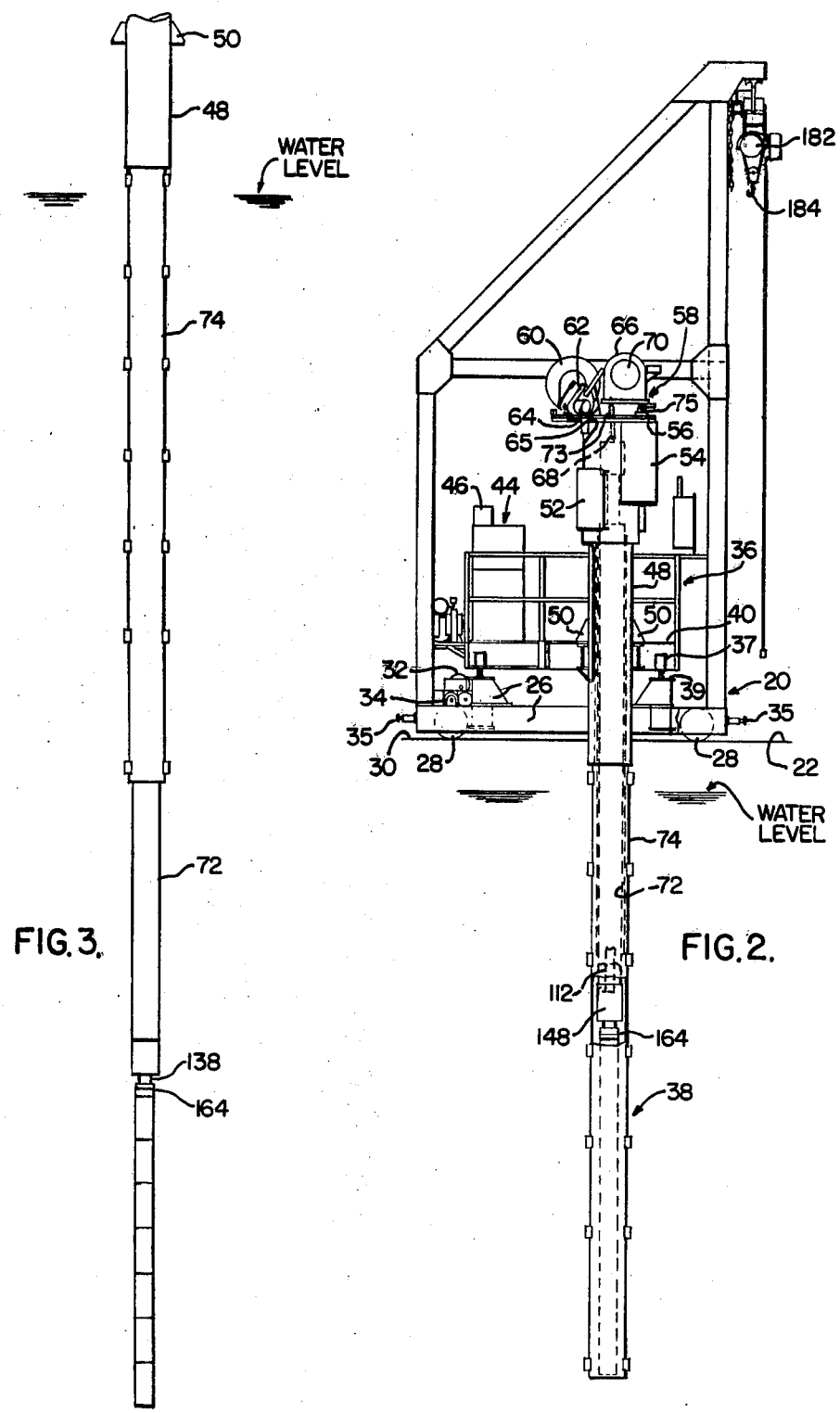

REFUELING MACHINE FOR A NUCLEAR REACTOR

BACKGROUND OF THE INVENTION

The invention described herein relates to refueling machines for a nuclear reactor and more particularly to an improved machine incorporating features designed to increase its reliability and to perform the refueling operation in a more efficient and economical manner.

During the operating life of a nuclear reactor, at periodic intervals, a portion of the reactor fuel assemblies are completely removed from the reactor core and disposed of as spent fuel. These assemblies are replaced by fresh assemblies, while the other fuel assemblies remaining in the core are shifted to different positions to achieve maximum power output with optimum utilization of energy contained in the nuclear fuel. As refueling takes place, each fuel assembly must remain completely submerged in neutron absorbing coolant to prevent fissioning and consequent generation of heat in the fuel rods.

To facilitate the refueling process, different designs of refueling apparatus have heretofore been used which incorporate features designed to achieve apparatus reliability, safety and economy in manufacture. One well known design in U.S. Pat. No. 4,086,132 assigned to the same assignee as the present invention, includes provision for removing control rod thimble plugs from the top of certain fuel assemblies, together with features for separately lifting a fuel assembly from the core. This patented design utilizes a housing which encloses a vertically movable mast arranged to actuate fingers into locking engagement with a fuel assembly, and provides for interlocks designed to positively hold the fuel assembly during transfer from the reactor core to a spent fuel cell. The refueling machine is efficient and reliable but because the equipment is designed to serve two functions, i.e., to remove a complete assembly and/or in a separate action, to remove the thimble plugs from the assembly, machine construction costs are high although maintenance cost appear to be minimal. Also, since operators cannot directly observe the refueling machine operation when the gripper portion of the machine and the fuel assembly is submerged, greater simplicity in design desirably should be incorporated in the refueling apparatus.

BRIEF SUMMARY OF THE INVENTION

Briefly stated, in accordance with a preferred embodiment of the invention, a movable bridge structure is supported on the containment walls above a nuclear reactor. A movable trolley mounted on the movable bridge, is arranged to move transversely to bridge movement and thereby provide a structure capable of being positioned over any one fuel assembly in the reactor core and the refueling pool area. The trolley platform carries controls and other equipment, and supports concentrically disposed masts which coact to protect and lift fuel assemblies from the reactor core. Since each fuel assembly must remain submerged in neutron absorbing liquid during refueling operations, an inner mast which lifts a fuel assembly is designed to be raised vertically in a submerged second mast prior to relocating the fuel assembly in a different area. Both masts can be rotated along their axis in unison to obtain the desired alignment of a fuel assembly, and unique camming arrangements are used for activating gripper fingers into engagement with the top of a fuel assembly.

BRIEF DESCRIPTION OF THE DRAWINGS

While the specification concludes with claims particularly pointing out and distinctly claiming the subject matter of the invention, it is believed that invention will be better understood from the following description taken in connection with the accompanying drawings wherein:

FIG. 2 is a side view of the refueling machine of FIG. 1 showing the inner mast and an attached fuel assembly in their uppermost raised position in the outer mast;

FIG. 3 is a view of the concentrically disposed masts shown in their elongated position;

DESCRIPTION OF THE PREFERRED EMBODIMENT

Figure 1:
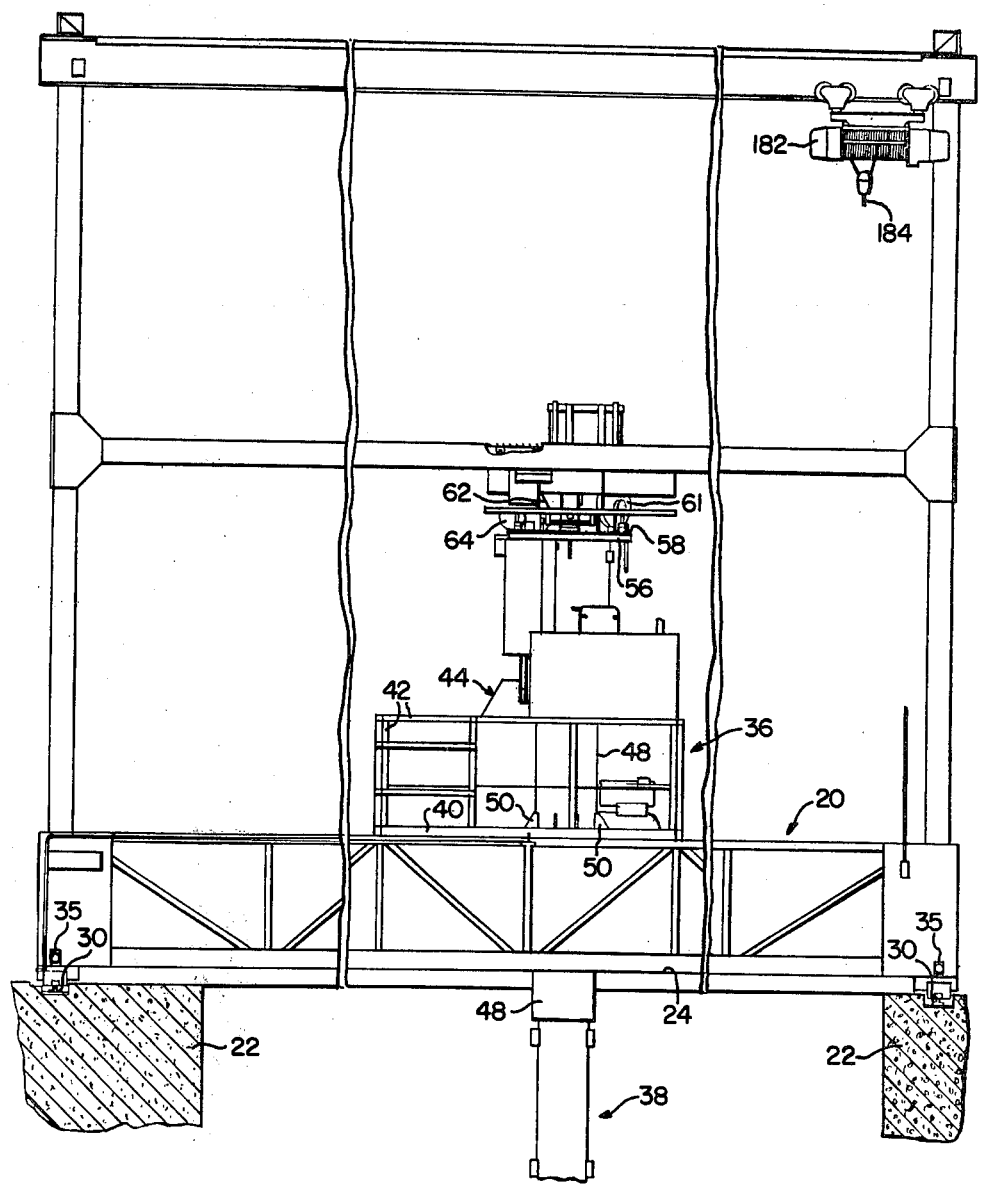
FIG. 1 is a view in elevation of the refueling machine and particularly showing how the bridge structure spans the containment walls of a nuclear reactor.

Referring now to the drawings wherein like reference characters designate like or corresponding parts throughout the several views, there is shown in FIGS. 1–3 a movable bridge 20 mounted on opposite walls 22 of a reactor containment and which spans the complete width of a reactor (not shown) located therebeneath. The bridge includes a deck 24 and girder and truck structural members 26 which imparts strength and rigidity to the bridge. It is designed for horizontal movement on wheels 28 and rails 30 fixed on top of walls 22 of the reactor containment. The wheels are driven by a motor 32 and longitudinally extending shafts 34. Spring loaded bumpers 35 protect opposite sides of the bridge.

A motor driven trolley 36 is mounted on wheels 37 that run on rails 39 mounted on bridge 20 for horizontal movement in a direction transverse to bridge movement, the arrangement of bridge and trolley being such that mast 38 supported from the trolley, can be positioned over any one fuel assembly in the reactor or refueling pool to effect either its insertion or removal from the reactor core. The trolley includes a deck or platform 40 and handrail 42 together with control console 44 which contains equipment for control of drive motors, hoists and air compressors, and television and other position readouts 46, and the like, which are conventional components required for this kind of operation.

The television camera mounted on the bridge structure is used to indicate the position of the bridge. The camera is pointed downwardly, sighting on an indicator strip on the containment walls that corresponds to core positions.

A stationary housing 48 for mast 38 is attached to platform 40 by flukes 50 welded to the housing peripheral surface and bolted to platform 40. As particularly shown in FIGS. 1 and 2, one end of the mast housing 48 extends below the trolley platform 40 and bridge deck 24 while the other end projects upwardly above the trolley. The upper end of mast housing 48 includes a window 52 for observing the position of the upper end of the masts, and supports electrical control cabinet 54 welded or otherwise affixed to the mast housing surface. A stationary plate 56 is mounted on the upper end of the housing 48 and has an opening therein through which hoist, electrical and air lines extend. This opening also serves to permit insertion and removal of the inner mast 72 for maintenance purposes. Each of housing 60 and 61 respectively enclose reels which support air lines and electrical cables (not shown) arranged to be paid out or taken in as the mast is raised or lowered. The reels are spring loaded in a direction to always bias the air hoses and electric cables to an up position so that as the inner mast is raised and lowered, the air hoses and electric cables automatically follow mast movement. The plate 56 supports hoist 66 mounted on plate 58 through load cell 73 and pivot 75. As described hereafter, hoist cable 68 supports inner mast 72 which in turn carries the weight of a fuel assembly. Load cell 73 mounted on plate 56 senses the weight of a fuel assembly which is observed by an operator through a readout. Depth gage 62 including a tape 65 also is spring loaded in tension and is arranged to display the level of a fuel assembly through window 64 as it is moved relative to the reactor.

On occasion it is desirable to remove the inner mast for maintenance and repair. To facilitate this operation, the hoist 66 is mounted on a pivot 75 which permits the hoist to move out of the way to permit inner mast removal.

Referring to FIGS. 4 through 7, the mast housing 48 is shown as enclosing an inner mast 72 and a concentrically disposed outer mast 74. As more fully described hereafter, the inner mast 72 is designed to carry the weight of a fuel assembly while the outer mast 74 serves as a guide for the inner mast, and also encloses the inner mast and fuel assembly when they are moved to a raised position. Referring to the upper part of FIG. 4, a lifting frame assembly 76 includes a housing having plates 78 and 80 each of which have centrally disposed openings as shown. A top lifting plate 82 positioned in the upper end of the housing carries a pair of eyebolts 84 attached thereto by bolts, each of the eyebolts being of a design to accept the ends of cable 68 which extend downwardly from the hoist 66 and carries the weight of the inner mast and a fuel assembly. For purposes of clarity, the electrical cable 65 and air lines 67 are not shown as extending through housing 76. The lifting frame assembly 76 further encloses swivel apparatus including a support 86 formed integral with or otherwise affixed to top lifting plate 82. The top end of a swivel bar 88 is pivoted at 90 to the support 86 while the lower end of the bar is pivoted at 92 to a similar support attached to a bottom lifting plate 94. The purpose of the swivel apparatus is to allow rotation of the inner and outer masts 72, 74 without rotating the two lifting cables thereby preventing twisting of the cables as the masts are raised and lowered. This swivel arrangement also maintains substantially equal tension in both lifting cables as the masts are raised and lowered. A mechanical direct reading tape 96 attached to the upper end of the lifting frame assembly is calibrated to show at any particular time the level of a fuel assembly.

The lifting frame assembly 76 is connected to the inner mast 72 by a plurality of support bars 98 attached at their upper ends to lifting plate 94 by bolts 100 and at their lower ends to plate 102 which closes the upper end of the inner mast. The weight of inner mast 72 and an attached fuel assembly is carried by the hoist cables 68 attached to eyebolts 84, top lifting plate 82, swivel bar 88, lower lifting plate 94 and the interconnecting bars 98 attached to upper plate 102 of inner mast 72. In the event the swivel mechanism fractured or failed, the mast would freely fall through the open-ended outer mast. To preclude such an occurrence, the top lifting plate 82 to which the cables 68 are attached, is made to a size greater than the opening in plate 78. Should swivel mechanism failure occur, the top lifting plate 82 engages the underside of plate 78 thus transferring the mast weight to enclosure 76, plate 78 and top lifting plate 82 to cables 68.

An air cylinder 104 having a piston (not shown) therein, is positioned intermediate these two components. Air lines 67 connected to the upper and lower ends of the cylinder housing respectively supplies and vent air from opposite sides of the piston in accordance with the direction of piston travel. A lifting eye 106 attached to the support 108 to the top of the cylinder is used for manually lifting the weight of actuator tube 112 should the cylinder mechanism or air supply fail. The lower end of the piston in cylinder 104 is connected through shaft extension 110 to the top of the actuator tube 112 which extends the complete length of inner mast 72. The function of actuator tube 112 is to vertically move gripper fingers 138 into and out of engagement with a fuel assembly nozzle as more fully described hereafter. Upper and lower limit switches 114, 116 attached to the side of cylinder 104 are actuated by a plunger 117 extending outwardly from opposite ends of the cylinder to thereby indicate by an indicator light whether the botom of the inner mast and lifting fingers are in an engaged or disengaged position with respect to the top of a fuel assembly.

Figure 4:
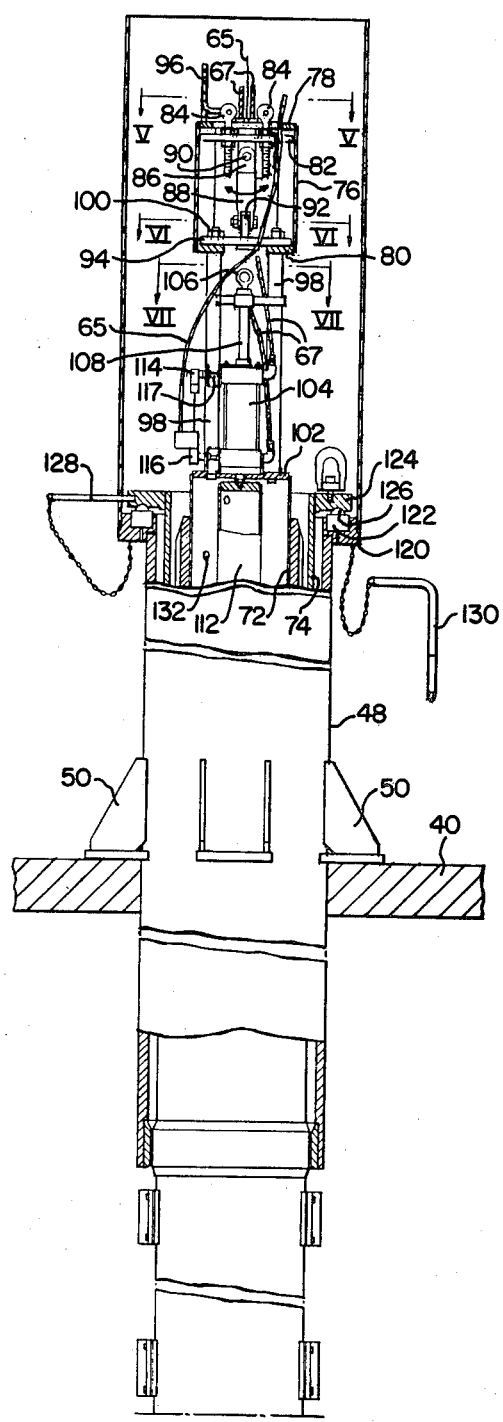
FIG. 4 is a view in elevation, partly in section, illustrating the arrangement used for permitting mast movement, and showing the mechanism used for actuating the gripper fingers into contact with a fuel assembly.
Figure 5:
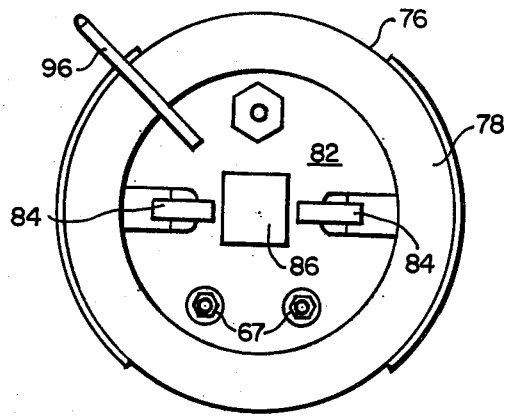
FIG. 5 is a view taken on lines V—V of FIG. 4.
Figure 6:
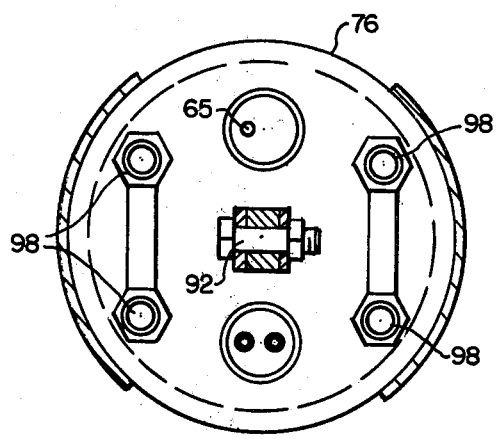
FIG. 6 is a view taken on lines VI—VI of FIG. 4.
Figure 7:
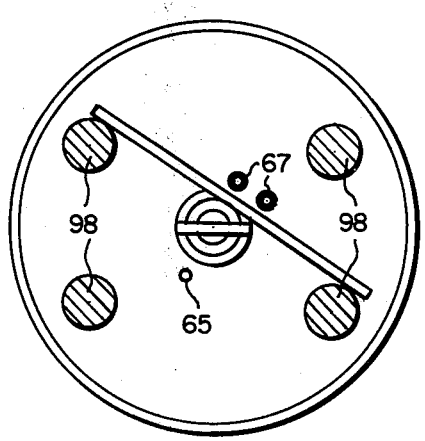
FIG. 7 is a view taken on lines VII—VII of FIG. 4.
Figure 8:
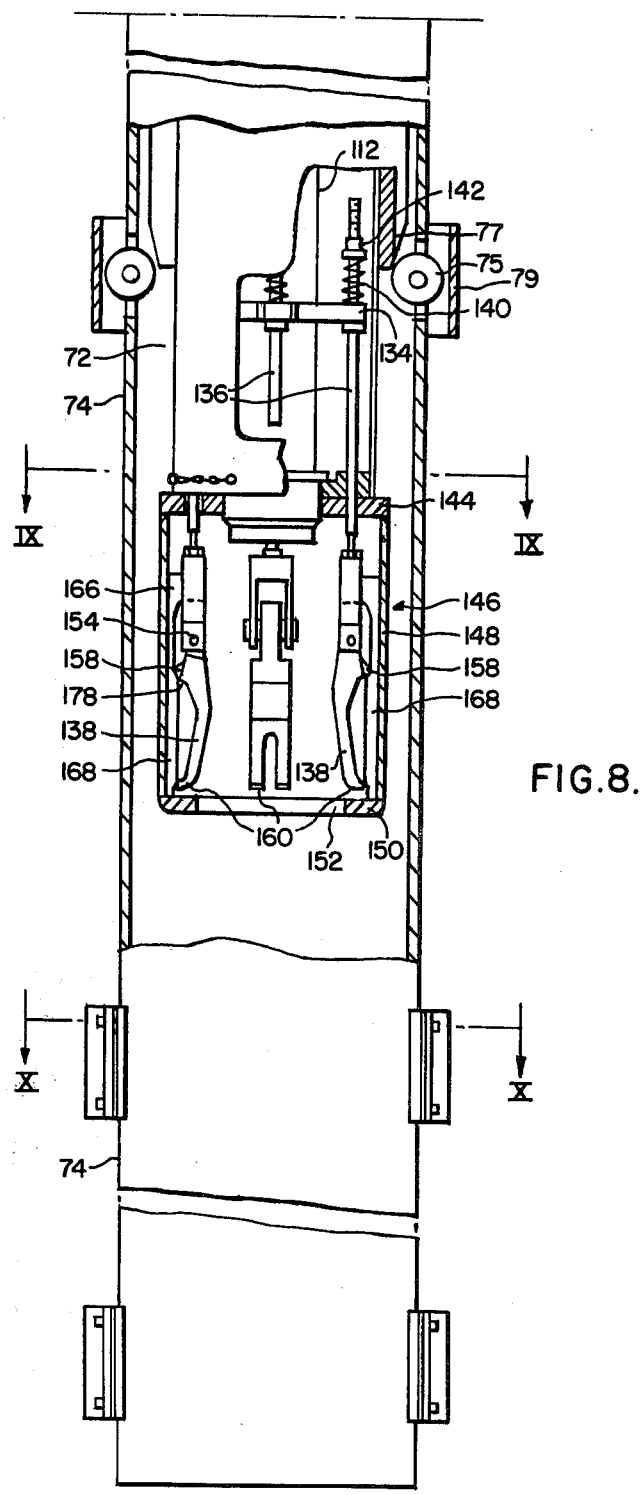
FIG. 8 is a view of the bottom end of the inner mast and illustrates the design and disposition of gripper fingers used for grasping the top end of a fuel assembly.
Figure 9:
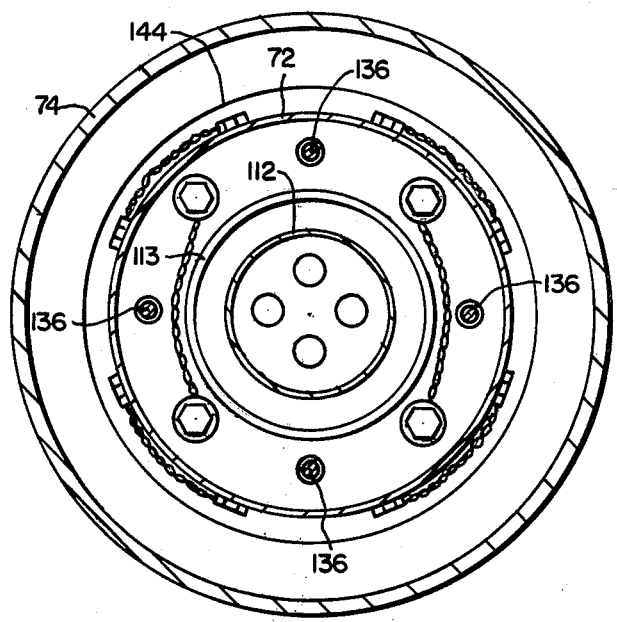
FIG. 9 is a view taken on lines IX—IX of FIG. 8.
Figure 10:
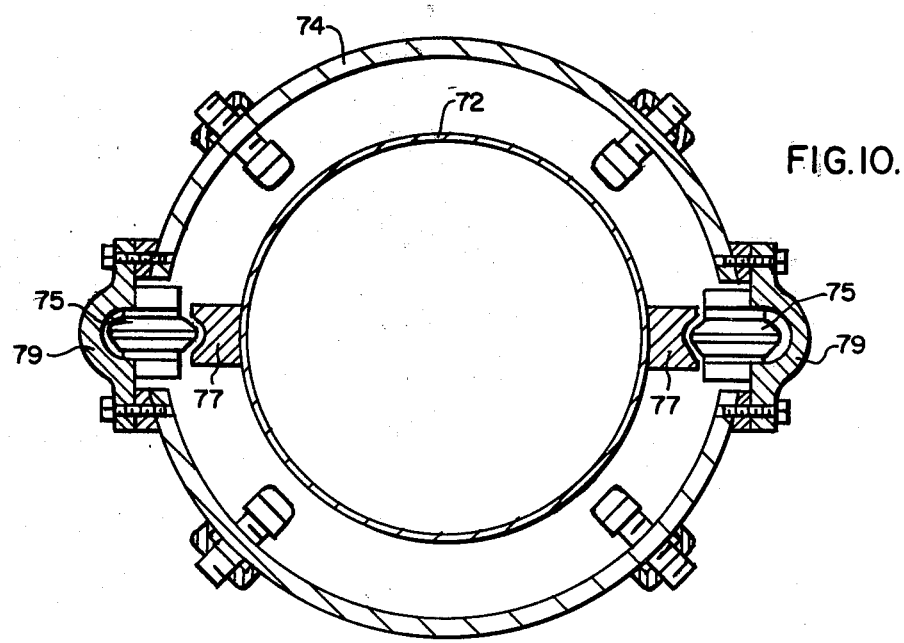
FIG. 10 is a view taken on lines X—X of FIG. 8.

The function of the mast housing 48 inner and outer mast 72, 74 and the actuator tube 112 will become more apparent from reference to FIGS. 4 and 8. The mast housing 48 rests on the deck or platform 40 of the trolley 36 and represents a stationary component. The housing encloses the masts and actuator tube 112 which is moved vertically by the piston in cylinder 104 to cause the gripper or lifting fingers 138 to engage the top of a fuel assembly nozzle. The weight of the fuel assembly is carried by the inner mast 72 which is adapted to be raised and lowered vertically by the hoist mechanism. The outer mast 74 is stationary with respect to the inner mast 72 and mast housing 48 but it includes guide rollers which engage the inner mast and keep it oriented in a single circumferential position.

The upper end of mast housing 48 includes features which permits the inner and outer masts to be rotated as a unit in order to properly align a fuel assembly when it is being located in a certain position. The mast housing 48 includes a flange 120 on its upper end and a ball type bearing 122. The outer mast includes a ring 124 welded or otherwise secured to the outer surface of the outer mast, and the underside of the ring contains a groove 126 which is complimentary to the configuration of the ball bearings 122. This arrangement permits the outer mast 74 and the inner mast 72 to be rotated manually in unison when the pin 128 is placed in openings formed in the outer surface of ring 124. Pin 130 is designed to fit in openings 132 to support the mast in a vertical position when maintenance or repairs are being performed on the mechanically operating components attached to the mast.

FIG. 8 illustrates the arrangement used for latching on to the top of a fuel assembly. The actuator tube 112 extends essentially the full length of the inner mast 72 and a spider in the form of a ring 134 is attached to the outer surface of the tube. Four equally spaced support bars 136 extend downwardly through openings in the spider 134 and terminate at the lower ends in gripper fingers 138. The upper end of each support bar above the spider 134 includes a spring 140 which is held under a slight degree of compression by a spring retainer 142. The lower end of the support bars extend through openings formed in the upper plate 144 of the gripper assembly 146. Cam supports 148 serve to interconnect the upper plate 144 with a bottom plate 150 equipped with openings 152 through which the fingers extend when actuated downwardly into a fuel assembly engaged position. The cam supports are individual members each having cam surfaces engageable by the gripper fingers. It will be evident that as the actuator tube 112 is moved downwardly all of the gripper fingers 138 will move from their housed position through opening 152 to a new position where they are adapted to engage the upper end of a fuel assembly.

Figure 11:
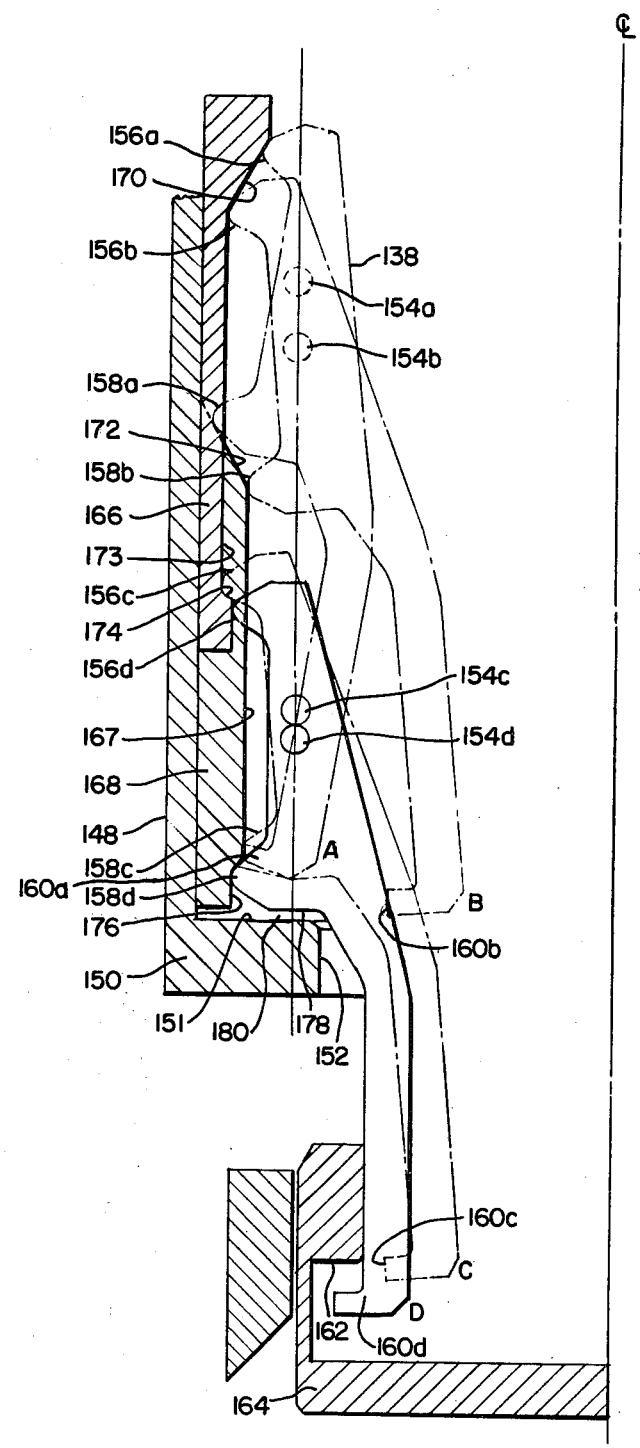
FIG. 11 illustrates the different positions that a gripper finger will assume during the time it is moved from an unengaged to an engaged position on a fuel assembly.

As more fully shown in FIG. 11, each gripper finger 138 is formed somewhat to the configuration of a bell crank and is pivoted about a pivot pin 154. Each gripper finger further is equipped with a pair of lobes 156, 158 and lifting projection 160. In addition to the lobes being spaced from one another, they are offset from each other along the gripper finger length. As each gripper finger moves from an unlatched position in the gripper assembly to a fuel assembly latched position, it is caused to oscillate about pivot pin 154 as it moves axially through four different positions: A, B, C and D, to the latched position. In the latched position D, the projection 160 is located underneath the ledge 162 formed on the upper nozzle 164 of a fuel assembly.

To achieve such movement between the unlatched and latched positions, each of lobes 156 and 158 of each finger respectively engage separate cams 166, 168 mounted on the cam supports. These cams are located alongside each other with cam 168 extending further downwardly into the gripper assembly 146. Further, the cams are offset from each other along a longitudinal axis and are arranged to be contacted respectively by finger lobes 156, 158 which as previously indicated, are also offset from each other. To help identify each position A through D, that the gripper fingers reach during downward travel, the reference characters 156, 158 for the lobes, and 160 for the projection will carry a subscript a, b, c or d as appropriate for the particular position. In position A which represents the unlatched position of the gripper fingers, i.e. the fully housed position, lobe 156a of each finger is at the top of cam surface 170 of cam 166 while lobe 158a of each finger is at the bottom end of the cam surface 172 of cam 168. Projection 160a of each finger rests on a flat surface 167 of cam 168.

As the fingers are moved downwardly by actuator tube 112 to position B, finger lobe 156b moves to the bottom of cam surface 170 while lobe 158b moves to the top end of cam surface 172. This action causes projection 160b to move inwardly a distance to clear the opening 152 in the bottom of the gripper assembly and the opening formed in the top of nozzle 164. Further downward movement of the actuator tube 112 causes the gripper fingers to move to the C position and in so doing, lobe 156c slides along surface 173 of cam 166 until it reaches the bottom of the cam surface 174. Lobe 158c which previously had reached the top of cam surface 172 slides along the flat surface 167 of cam 168 until it reaches the top of cam surface 176. Since both lobes 156, 158 have moved along a flat uninterrupted surface, the projection 160 moves axially of the gripper assembly and through the bottom plate opening 152 without changing its angle or attitude with respect to the centerline of the assembly.

Further downward movement of the actuator tube 112 causes the gripper fingers to move to the D position. In so doing, lobe 156d rides up the cam surface 174 on cam 166 while lobe 158 slides down the cam surface 176 of cam 168. This action has the effect of causing projection 160 to move outwardly into the space provided in the top of the fuel assembly nozzle 164 and into a position just below surface 162 of the nozzle. The movement of projection 160 into the nozzle also places flat area 178 of the gripper finger immediately above the upper surface 151 of plate 150. This flat area extends a substantial distance outwardly and along the top surface 151 of plate 150. The distance indicated as 180 between surfaces 151 and 178 is less than the distance between the upper surface of projection 160 and the nozzle surface 162. These distances are intentionally chosen to make certain that the weight of a fuel assembly is carried completely by the inner mast rather than the gripper assembly and the actuator tube.

OPERATION

In operation, to remove a fuel assembly from a nuclear reactor, both the bridge 20 and the trolley 36 are maneuvered into position to place the mast 38 directly over a fuel assembly to be removed from the reactor. At this time, the inner mast 72 is in a stored, raised position in outer mast 74, and gripper fingers 138 are housed in the gripper finger assembly in a fuel assembly unlatched position. Hoist 66 with its attached cables 68 is energized to lower inner mast 72 downwardly to a position above the fuel assembly to be removed. The operator is made aware of the inner mast vertical position and the attitude of gripper fingers by respectively observing the mast position readout tape 65 and the gripper finger indicator lights (not shown). Since both the mast housing 48 and the outer mast 74 are not designed for vertical movement, as the hoist lowers the inner mast 72 with its attached air cylinder and actuator tube 112, reel 60 will pay out the electrical lines and flexible air hoses 67. As the inner mast extends downwardly below the open end of outer mast 74, it eventually comes to rest within a few inches of the top of a fuel assembly. If its attitude with respect to a fuel assembly is not precisely correct, the mast may be moved by moving bridge and trolley in X-Y directions, or rotated about its axis on bearings 122. When the precise position is obtained, the inner mast is then lowered until its bottom surface rests on top the fuel assembly.

To effect movement of gripper fingers 138 from a fuel assembly unlatched to a latched position, air is applied to the upper side of the piston in cylinder 104 thus causing the actuator tube 112 to move downwardly from its position shown in FIG. 4. As the piston reaches the bottom of its stroke, limit switch 116 is closed thus indicating to an operator only that the gripper fingers are in a fuel assembly latched position. Simultaneously with the downward movement of the piston in cylinder 104 and the actuator tube 112 directly connected therewith, the four gripper fingers 138 attached to the end of the actuator tube move over cams 166, 168 and through the steps A through D described above. When the piston reaches the end of its stroke the actuator tube is in its lowermost position and projection 160 on the end of the gripper fingers 138 lies directly beneath the surface 162 of the upper nozzle 164 of the fuel assembly. The hoist can then be energized to lift the fuel assembly from the reactor core.

When the inner mast is lowered or extended from the outer mast to its maximum extent, and the gripper fingers are in position to raise a fuel assembly, the length of the inner mast plus the length of a fuel assembly substantially equals the full length of the outer mast. Therefore, when the inner mast with its attached fuel assembly is raised to its upper most point in the outer mast as indicated in FIG. 2, both the inner mast and the fuel assembly are in a completely housed position thereby permitting an operator to move the mast freely from one place to another. During the time of such movement it will be noted that the fuel assembly is always beneath the water level indicated in FIG. 2.

When it is desired to raise the inner mast and its attached fuel assembly up into the outer mast, the operator energizes the hoist which then acts to raise the inner mast in an upward direction. As this occurs, the projection 160 on each gripper finger contacts its corresponding surface 162 of the stationary upper nozzle, but the small space 180 remains unchanged. As the weight of the fuel assembly just starts to be carried by the gripper fingers, the inner mast moves relative to the fingers through the space 180 and springs 140 compress. The flat part 178 of the gripper fingers thereupon contact the upper surface of plate 150 of the gripper assembly. Further upward movement of the inner mast then establishes firm contact between the finger surfaces 178 and the plate surfaces 151 to thereby transfer the load of the fuel assembly through the gripper fingers and into the structural walls of the inner mast and from there to the support bars 98, lifting frame assembly 76 and the cables attached to the hoist motor. The inner mast and attached fuel assembly are then raised completely in the outer mast until it reaches the housed position indicated in FIG. 4.

As the fuel assembly is moved to a desired position, or to another position in the reactor, the operator energizes hoist 66 which then lowers the inner mast with its attached fuel assembly downwardly out of the outer mast to a point where the fuel assembly is to be deposited. In the event it is not completely oriented in position, the bridge and trolley may be moved slightly to arrive at a precise position or the mast and fuel assembly may be rotated about their axis by applying force to bar 128 which turns the inner mast 74 on ball bearings 122. Upon reaching the precise selected position, the operator again energizes the hoist to lower the fuel asembly into its selected position in the reactor core. At that time, air applied to the bottom side of the piston in cylinder 104 moves the piston upwardly, while venting the other side of the cylinder, and thus causes the gripper fingers to reverse the steps A through D and return to their housed position in the gripper assembly as shown in FIG. 8. When the piston reaches its uppermost position in the cylinder, the upper limit switch 114 is closed thus indicating to an operator that the gripper fingers are in an unlatched position.

It will be apparent that many modifications and variations are possible in light of the above teachings and it therefore should be understood that within the scope of the appended claims the invention may be practiced other than as specifically described.

We claim:

1. A refueling machine for a nuclear reactor comprising:
   a movable bridge arranged for back and forth movement spanning the containment walls of a nuclear reactor;
   a trolley on said bridge movable in a direction transverse to bridge movement, the arrangement being such that the trolley is adapted to be positioned in the X-Y position over any one fuel assembly in a nuclear reactor after the reactor head has been removed;
   a platform on said trolley for supporting a stationary mast housing and concentrically disposed inner and outer masts in said housing;
   a hoist mechanism including a drive motor and a cable reel attached thereto surmounting said mast housing;
   a lifting frame assembly connected at its upper end to a cable on said reel and at its lower end to the inner mast to thereby facilitate raising and lower of the inner mast;
   actuation means on said inner mast, said actuation means including an actuation device connected to fuel assembly lifting fingers on the bottom end thereof;
   a cam arrangement on said inner mast designed for coaction with said fingers as the fingers are moved vertically by the actuation means between fuel assembly latched and unlatched positions; and
   means for lifting said fuel assembly from the reactor core.

2. The refueling machine according to claim 1 wherein the lifting frame assembly includes swivel means designed to permit mast movement in back-and-forth and side-to-side directions to permit fuel assembly orientation with respect to openings in the reactor core.

3. The refueling machine according to claim 1 wherein said actuation means includes a power actuated member having a shaft connected to the actuation device so that as the power member operates, it causes the actuation device to move the lifting fingers vertically relative to a fuel assembly in the reactor.

4. The refueling machine according to claim 3 wherein said power actuation member comprises a piston-cylinder arrangement wherein the piston moves the actuation device and its connected lifting fingers; and
   limit switches mounted on opposite ends of the member which are operated by the piston as it moves between upper and lower positions; and
   indicating means connected with said switches which indicate the latched or unlatched position of the lifting fingers.

5. The refueling machine according to claim 1 wherein said outer mast is located between the stationary mast housing and inner mast;
   guiding means on said inner and outer masts which coact to always move the inner mast vertically; and
   rotatable means on said stationary mast which permits rotation of the inner and outer masts to orient a fuel assembly attached to the inner mast to a desired angular position relative to the reactor core.

6. The refueling machine according to claim 5 wherein the guiding means comprises at least one member on the inner mast which cooperates with a complementary shaped member on the outer mast to guide the inner mast vertically when moved from one elevation to another.

7. The refueling machine according to claim 6 wherein the member on the inner mast includes a grooved surface and the member on the outer mast is a rotating element which rolls in the groove during mast movement.

8. The refueling machine according to claim 5 wherein said rotatable means on the housing includes a flange on the stationary mast supporting a rotating element bearing, and the outer mast includes a peripherally disposed ring provided with a groove complementary to the shape of the bearings, so that when the outer mast is rotated on the bearings, the mast and its attached fuel assembly may be rotated to a desired angular orientation with respect to the reactor core.

9. The refueling machine according to claim 1 wherein said actuation means includes a power driven member directly connected with said actuation device to selectively impart reciprocating movement thereto inside the inner mast;
   a spider on said actuation device and support arms attached to and extending longitudinally of said spider; and
   means interconnecting said support arms with said lifting fingers so that when the actuation device moves said support arms vertically, the fingers respond to the configuration of the cams and move a distance sufficient to place a projection on each of said fingers in a fuel assembly latching or unlatching position.

10. The refueling machine according to claim 9 wherein the actuation device includes a tube adapted for longitudinal reciprocation in said inner mast;
   an opening at the bottom of said inner mast; and
   said gripper fingers are pivotally mounted on said support arms to permit response to the cam surface and accordingly move inwardly and downwardly to clear said opening in the inner mast, and then outwardly to a finger latching position relative to said fuel assembly.

11. The refueling machine according to claim 1 wherein said actuation means includes a power driven member directly connected to said actuation device to selectively impart reciprocating movement thereto inside the inner mast;
   a gripper assembly mounted on the bottom end of the actuation device, said gripper assembly comprising a spider attached to said device, a guiding plate attached to the bottom end of the actuation device and support bars extending from the spider through the guiding plate and terminating in said fingers; and
   coacting means on each of said fingers and said gripper assembly which transmits a load of a fuel assembly through said fingers and coacting means to the inner mast of the machine.

12. The refueling machine according to claim 11 wherein the gripper assembly includes a plate having a central opening therein attached to the bottom end thereof, said opening being of a size sufficient to permit the fingers to move vertically therethrough prior to moving outwardly to a fuel assembly latched position.

13. The refueling machine according to claim 11 wherein the cams are mounted between the upper and lower plates on the inside of said cam support, said cam arrangement including separate cams, one for each gripping finger so that the fingers are in a stored position inside the gripper assembly when in an unlatched position and extend through an opening in the bottom of the gripper assembly and into a position to grasp the fuel assembly when in the extended position.

14. The refueling machine according to claim 11 wherein said cam arrangement is mounted on the inner walls of the cylindrical cam support assembly, said cam arrangement including a pair of spaced cams radially offset from each other for each of said gripper fingers, each of said fingers including at least one lobe and an outwardly directed projection on the end of each finger so that when the actuation device is moved downwardly, the lobe rides on a complementary part on the cam, this moving the finger downwardly and outwardly so that the projection will lie under a portion of a top nozzle for a fuel assembly to thereby grasp the same and lift it vertically.

15. The refueling machine according to claim 14 wherein each of said fingers include a pair of spaced lobes longitudinally offset from each other, and a flat surface on said finger extending transverse to the finger axis;
   a plate having an opening therein attached to the lower end of the gripper assembly, the arrangement being such that as the actuation device moves the fingers downwardly, the lobes ride on said cams and move the fingers inwardly to thereby permit the projection on the end of each finger to move downwardly through the opening at said plate and stop in a position beneath a ledge on the upper nozzle of a fuel assembly, the flat part on said finger being positioned to engage the top surface of the lower plate and thereby transfer the weight of a fuel assembly through the fingers into the inner mast of the refueling machine.

16. The refueling machine according to claim 15 wherein each of said support bars connected to the lifting fingers are spring biased in a direction to raise the lifting fingers upwardly.

* * * * *